(12) United States Patent
Bentolila et al.

(10) Patent No.: US 6,310,469 B1
(45) Date of Patent: Oct. 30, 2001

(54) SYSTEM AND METHOD TO DETECT SYNCHRONOUS SWITCHING REGULATOR LIGHT LOAD

(75) Inventors: Ariel S. Bentolila, Santa Clara, CA (US); Sisan Shen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/596,605

(22) Filed: Jun. 19, 2000

(51) Int. Cl.[7] ........................................ G05F 1/40
(52) U.S. Cl. ............................................. 323/283
(58) Field of Search .................. 323/223, 224, 323/282, 283, 284, 285; 363/22–25

(56) References Cited

U.S. PATENT DOCUMENTS

| | | | |
|---|---|---|---|
| 3,875,493 | * | 4/1975 | Kunzinger et al. ............... 321/18 |
| 4,496,897 | * | 1/1985 | Unnewehr et al. ............... 322/25 |
| 5,773,966 | * | 6/1998 | Steigerwald ..................... 323/284 |

* cited by examiner

Primary Examiner—Matthew Nguyen
(74) Attorney, Agent, or Firm—Dwight N. Holmbo; Wade James Brady, III; Frederick J. Telecky, Jr.

(57) ABSTRACT

An efficient and practical system and method to determine when a switching DC-DC regulator is under a light load condition. The light load condition is determined by monitoring the switch node voltage to detect a zero-crossing voltage that is load dependent and occurs when the average output current minus half the switching current at the switch node is less than or equal to zero.

11 Claims, 1 Drawing Sheet

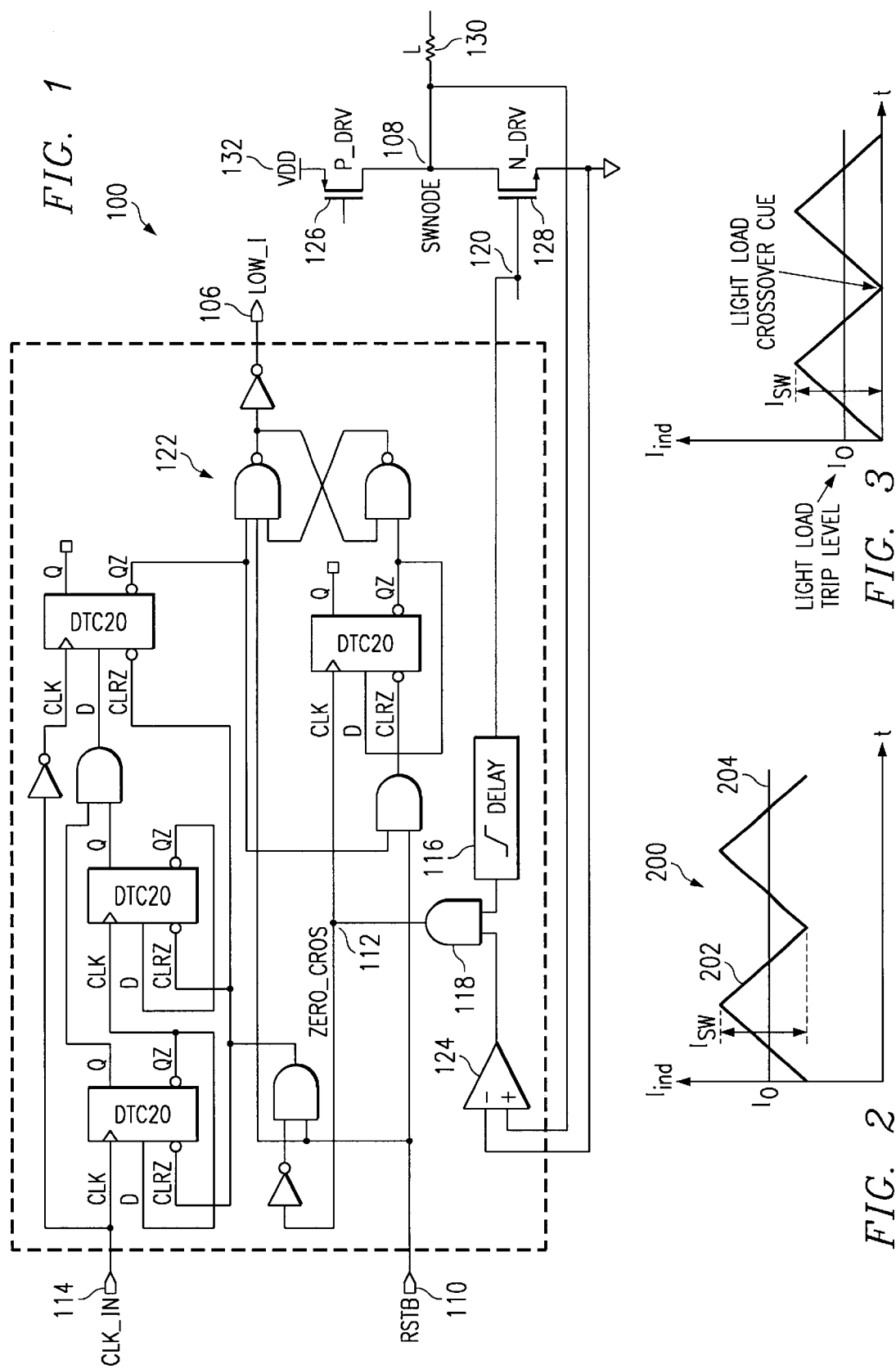

SYSTEM AND METHOD TO DETECT SYNCHRONOUS SWITCHING REGULATOR LIGHT LOAD

RELATED PATENT APPLICATIONS

This application is related to U.S. patent application Ser. No. 09/588,399 entitled High Efficiency Switching DC-DC Regulator, filed on Jun. 2, 2000, by Ariel S. Bentolila and Sisan Shen; and U.S. patent application Ser. No. 09/588,089 entitled A Method To Switch MOSFETs Using Recycled, Parasitic Energy, filed on Jun. 2, 2000, by Ariel S. Bentolila and Sisan Shen.

BACKGROUND OF THE INVENTION

1. Field of the Invention

This invention relates generally to switching DC-DC regulators, and more particularly, to a technique of detecting a light output loading condition of synchronous switching regulators.

2. Description of the Prior Art

Systems and methods to sense light loading of synchronous switching regulators are known. Known systems and methods generally detect light load conditions by adding a sense resistor in the conduction path, or by sensing a voltage rise in the regulator's output. A disadvantage of these standard systems and methods is the necessity to add costly components to detect light loads. Such known synchronous switching regulator light load detection techniques inefficiently detect light loads by failing to recognize that assets already employed in synchronous switching regulators can also serve to detect a light loading operating point. In view of the foregoing, a need exists in the synchronous switching DC-DC regulator art for a system and method to detect light load conditions by using assets already employed in the switching regulator thereby eliminating the need for additional components such as sense resistors or other components necessary to monitor a voltage rise in the regulator's output.

SUMMARY OF THE INVENTION

The present invention is directed to a buck and boost synchronous switching DC-DC regulator light load detection technique that provides a mechanism to determine a general light loading condition with out the necessity to add high precision components or detection systems. The present light load detection system includes a SWnode connected comparator and a pulse detector for generating a light load output signal LOW-I. The light load condition is characterized by the point where the switching losses dominate over DC conduction losses and is sensed by positive-going switch node voltages during the discontinuous operating phase of the switcher. Energy is supplied to the switching node via an inductor. The output load current is simply the average inductor current in which a constant amplitude triangular, switching, current waveform rides upon. Thus, the output load current directly shifts up and down this offset, triangular inductor current waveform. When the switching node voltage goes positive, for example, the inductor is devoid of current and is charging in the reverse direction. This crossover, or discontinuous operating point, is load dependent, as described above, and occurs when the average output current minus half the switching current goes negative. Thus, a desired range of light load trigger points can be implemented by choosing the inductor to accommodate a specified trip range over the supply voltage since the switching current amplitude, i.e., the above described triangular waveform, is a function of the supply voltage, frequency, duty cycle, and passive components, and is largely independent of loading. Known techniques incur significant costs and energy loss by failing to recognize that for most applications, light load detection could be achieved with existing assets as prescribed by this invention, instead of adding supplementary high precision components and/or high cost detection systems.

According to one aspect of the present invention, light load conditions for a buck and boost synchronous switching DC-DC regulator are sensed by a positive going switch node voltage during the discontinuous operating phase of the switcher.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein:

FIG. 1 illustrates a system, including a SWnode connected comparator and a pulse detector for generating a light load output signal LOW-I according to one preferred embodiment of the invention;

FIG. 2 is a waveform diagram that illustrates the synchronous switching DC-DC regulator inductor current ($I_{ind}$) over two full switching cycles wherein the average of the switching current, as indicated, is the output current ($I_o$) for the system depicted in FIG. 1; and FIG. 3 is a waveform diagram that depicts the onset of the light load condition.

While the above-identified drawing figures set forth alternative embodiments, other embodiments of the present invention are also contemplated, as noted in the discussion. In all cases, this disclosure presents illustrated embodiments of the present invention by way or representation and not limitation. Numerous other modifications and embodiments can be devised by those skilled in the art which fall within the scope and spirit of the principles of this invention.

DETAILED DESCRIPTION OF THE PREFERRED EMBODIMENTS

Regarding many practical systems, it is very useful to know, even if only approximately, when a switching regulator is not under significant loading. To detect such a light loading condition, known systems and techniques generally add inefficient and expensive current sensing components such as resistors, comparators, precision OP-amps, extra IC pins, and voltage references. In contrast, the present inventors have recognized that the components necessary to implement the present invention already exist in the system that turns off the synchronous FET when in the discontinuous switching mode. Thus, current systems add significant cost and complexity to achieve high precision light load detection, when inherent system components could be used to provide lower precision, but sufficient, light loading information at no substantial additional cost or complexity.

Looking now at FIG. 1, a synchronous switching DC-DC regulator system 100, includes a switch node connected comparator 122 and a pulse detector 124, to generate the precursor light load output signal for LOW-I 106, according to one preferred embodiment of the invention to provide an efficient and practical method to determine when the switching DC-DC regulator is under a light loading condition. This light loading condition can be characterized by the point where the switching losses dominate over DC conduction losses. However, for the purposes of this invention, 'light load' is defined as a range of operating points near, as known by those skilled in the art, but not necessarily equal to, the ideal point where the switching losses dominate over DC conduction losses. FIG. 1 illustrates one practical implementation of the present invention that provides for light loading detection. The RSTB signal 110 sets initial condition (Low_I 106="0") when RESETB starts out low. Upon detecting a positive going zero crossing voltage at the switch node 108, a short active high pulse will be generated at node ZERO CROS 112. If there is no zero crossing event for two consecutive CLK_IN 114 cycles, LOW_I 106 will be reset to Low. The rising edge delay block 116 and the AND gate 118 are introduced so that any "kick-back" glitch when N_DRV 120 changes from low to high is suppressed when N_DRV 120 is set high.

The present inventors have importantly noted that only positive-going voltages during the off-time, or discharge, phase give easily detected loading information since the inductor 130 starts charging in the opposite direction after it runs out of energy and, hence, just entering discontinuous mode. Otherwise, the node 108 is either fully on, or an RDS drop above or below ground for the boost and buck respectively. Standard methods commonly measure output loading by a voltage drop as a current draws across a resistance. The present invention, however, implements an indirect method that is not the analog of load sensing, but instead is an indirect approximate way for the inductor 130 to indicate when loading is below some threshold by means of a zero crossing detection, instead of requiring a costly op-amp and systems to precisely trigger on the very small I*R drop. Importantly, the inductor 130 has a certain peak-to-peak switching current, where when the lower peak (current) goes below zero, a positive voltage develops at the switch node 108; and this event is directly proportional to loading. Measuring negative going zero-crossing SWnode 108 voltages would require much more complex, and precise analog circuits, and would not be very reliable since the RDSon of the FET 126, 128 varies widely with temperature (T), as contrasted with the present positive going zero-crossing event, which is largely insensitive to T.

In this way, light load conditions are sensed by positive going switch node 108 voltages during the discontinuous operating phase of the switcher. Transistors 126, 128 are configured to form a charge-recycled totem-pole, binary push-pull MOSFET output stage switch having a common switch node 108 having energy storage elements such as an inductor 130 connected thereto.

FIG. 2 is a waveform diagram 200 that illustrates synchronous switching DC-DC regulator switch node inductor current ($I_{ind}$) 202 over two full switching cycles wherein the average of the switching current 202, as indicated, is the output current ($I_o$) 204 for the system 100 depicted in FIG. 1. Energy is supplied to the switching node 108 via an inductor 130 with resultant current waveforms as indicated in FIG. 2. The output load current 204 is simply the average inductor current, marked by the $I_o$ line. The constant amplitude triangular current 202 waveform shifts up and down directly with the output load current, $I_o$ 204. Thus, when the switching node 108 voltage goes positive, for example, the inductor 130 is devoid of current and is charging in the reverse direction.

This crossover, or discontinuous operating, point is load dependent and occurs when the average output current $I_o$ 204 minus half the switching current $I_{sw}$ 202 goes negative; or light_load is when $I_o$−0.5* $I_{sw}$ 202 is less than or equal to zero.

FIG. 3 illustrates the onset of the discontinuous mode of operation discussed above with reference to FIGS. 1 and 2. The switching current $I_{sw}$ 202 is a function of supply voltage 132, frequency, duty cycle, and passive components, and is largely independent of loading. Thus, a desired range of light_load trigger points, near the above described ideal point, can be reliably implemented by choosing the inductor 130 to accommodate a specified trip range over the supply voltage $V_{dd}$ 132. Those experienced in the art of switching regulator design can select these parameters to ensure the requisite system specifications are met for worst ease operating conditions.

In summary explanation of the above, the present synchronous switching DC-DC switching regulator, light load detection technique provides a mechanism to determine a general light loading condition without requiring additional components beyond that necessary to formulate a conventional synchronous switching DC-DC switching regulator. Known switching DC-DC regulator structures incur significant costs and energy loss by failing to recognize that for most applications, light load detection could be achieved with existing assets as prescribed by this invention, instead of adding supplemental higher precision, and high cost detection systems.

This invention has been described in considerable detail in order to provide those skilled in switching converter and switching regulator design with the information needed to apply the novel principles and construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, while particular embodiments have been described herein above with reference to use of an inductor as an energy storage element, other storage elements such as the output parasitic capacitance through each respective output FET 126, 128 can also be utilized to provide at least a portion of the requisite energy under certain operating conditions. Further, the present invention can just as easily be implemented without requiring any particular pulse detector or switching regulator architecture, such as current mode.

What is claimed is:

1. A switching regulator light load detection system comprising:
   a MOSFET synchronous DC-DC switching regulator system having at least one NMOS FET and at least one PMOS FET connected in binary push-pull configuration and further having a common switch node;
   an inductor connected to the common switch node; and
   a positive going zero-crossing voltage detector connected to the common switch node.

2. The switching regulator light load detection system according to claim 1 wherein the positive going zero-crossing detector comprises a voltage comparator configured to detect a zero-crossing voltage and generate a signal therefrom.

3. The switching regulator system according to claim 2 further comprising a signal detection system configured to generate a switching regulator output, light loading operating point in response to the signal generated by the voltage comparator.

4. The switching regulator system according to claim 1 further comprising a signal detection system configured to generate a switching regulator output, light loading operating point indicator in response to the switch node voltage.

5. A switching regulator light load detection system comprising:
- a MOSFET synchronous DC-DC switching regulator system having at least one NMOS FET and at least one PMOS FET connected in binary push-pull configuration and further having a common switch node;
- an energy storage device connected to the common switch node; and
- means for detecting a zero-crossing switch node voltage and generating a switching regulator output, light loading operating point in response therefrom.

6. The switching regulator light load detection system according to claim 5 wherein the energy storage device is an inductor.

7. The switching regulator light load detection system according to claim 6 wherein the inductor is configured to accommodate a predetermined current induced trip range associated with the switching regulator output, light loading operating point.

8. A method of detecting a switching regulator light load condition, the method comprising the steps off:
- a) providing a switching regulator light load detection system comprising:
  - a MOSFET synchronous DC-DC switching regulator system having at least one NMOS FET and at least one PMOS FET connected in binary push-pull configuration and further having a common switch node;
  - an inductor connected to the common switch node;
  - a positive going zero-crossing voltage detector connected to the common switch node; and
  - a pulse detector connected to the positive going zero-crossing voltage detector;
- b) detecting a change in common switch node voltage; and
- c) generating a switching regulator control output signal, light loading operating point indicator when a positive going switch node voltage crosses zero volts.

9. A method of detecting a switching regulator light load condition, the method comprising the steps of:
- a) providing a switching regulator light load detection system comprising:
  - a MOSFET synchronous DC-DC switching regulator system having at least one NMOS FET and at least one PMOS FET connected in binary push-pull configuration and further having a common switch node;
  - an inductor connected to the common switch node; and
  - a pulse detector connected to this common switch node, the pulse detector configured to detect a switch node current;
- b) detecting a change in common switch node current during operation of the switching regulator; and
- c) generating a switching regulator control output, light loading operating point indication when an average output current associated with an output load current minus half a switching current associated with a peak-to-peak switching current becomes no less than zero during a discontinuous operating phase of the switching regulator.

10. A switching regulator light load detection system comprising:
- a MOSFET synchronous DC-DC switching regulator system having at least one NMOS FET and at least one PMOS FET connected in binary push-pull configuration and further having a common switch node;
- a voltage comparator connected to the common switch node and configured to detect a zero-crossing voltage at the common switch node and generate a signal therefrom;
- a signal detection system configured to generate a switching regulator output, light loading operating point indicator in response to the signal generated by the voltage comparator; and
- an inductor connected to the common switch node, wherein the inductor is configured to accommodate a predetermined load detection trip range associated with the switching regulator output, light loading operating point.

11. The switching regulator light load detection system according to claim 10 further comprising a signal delay system connected to the NMOS FET and configured to prevent a "kick-back" glitch from being introduced into the signal generated by the voltage comparator.

* * * * *